United States Patent [19]
Boyle et al.

[11] Patent Number: 5,964,318
[45] Date of Patent: Oct. 12, 1999

[54] SYSTEM FOR MAINTAINING THE QUALITY AND LEVEL OF LUBRICANT IN AN ENGINE

[75] Inventors: Frederick P. Boyle, Kirtland; Klaus-Werner Damm, Chagrin Falls; Gary A. Garvin; Gary L. Orloff, both of Mentor, all of Ohio

[73] Assignee: The Lubrizol Corporation, Wickliffe, Ohio

[21] Appl. No.: 09/005,545

[22] Filed: Jan. 12, 1998

[51] Int. Cl.[6] .............................. F16C 3/14; F01M 1/18; F01M 1/00

[52] U.S. Cl. ........................ 184/1.5; 184/6.4; 123/196 S

[58] Field of Search ................................ 184/1.5, 6.1, 6.4, 184/108; 123/196 R, 196 S, 196 A; 210/87

[56] References Cited

U.S. PATENT DOCUMENTS

| | | |
|---|---|---|
| 1,554,952 | 9/1925 | Clark . |
| 2,066,452 | 1/1937 | Bernard et al. . |
| 2,717,584 | 9/1955 | Upton . |
| 3,114,356 | 12/1963 | Werner et al. . |
| 4,417,561 | 11/1983 | Yasuhara . |
| 4,421,078 | 12/1983 | Hurner . |
| 4,495,909 | 1/1985 | Hurner . |
| 4,506,337 | 3/1985 | Yasuhara .......................... 123/196 S X |
| 4,674,456 | 6/1987 | Merritt . |
| 4,796,204 | 1/1989 | Inoue .............................. 123/196 S X |
| 4,869,346 | 9/1989 | Nelson . |
| 5,092,429 | 3/1992 | Linares et al. ............................ 184/1.5 |
| 5,238,085 | 8/1993 | Engelmann . |
| 5,263,445 | 11/1993 | Bedi et al. ............................ 184/1.5 X |
| 5,372,219 | 12/1994 | Peralta ..................................... 184/1.5 |
| 5,390,762 | 2/1995 | Nelson . |
| 5,431,138 | 7/1995 | Hurner . |
| 5,476,073 | 12/1995 | Betts . |
| 5,554,278 | 9/1996 | Henderson . |
| 5,592,395 | 1/1997 | Braun et al. . |
| 5,685,396 | 11/1997 | Elkins et al. .............................. 184/1.5 |
| 5,720,249 | 2/1998 | Johnson et al. . |

FOREIGN PATENT DOCUMENTS

| | | |
|---|---|---|
| 0 146532 | 6/1985 | European Pat. Off. . |
| 0 793005 | 9/1997 | European Pat. Off. . |
| 720222 | 12/1954 | United Kingdom . |

OTHER PUBLICATIONS

Japanese Laid–Open Publication No. 50–145744, K. Hirami, May 15, 1974.

*Primary Examiner*—Tamara L. Graysay
*Assistant Examiner*—Brandon C. Stallman
*Attorney, Agent, or Firm*—Beverly A. Pawlikowski; David M. Shold

[57] ABSTRACT

A system for measuring the quality and level of lubricant in an engine lubricant reservoir includes a valve for selectively directing a portion of lubricant from the engine through a first conduit for return to the engine or through a second conduit for removal from the engine. Within the first conduit are one or more sensors for sensing the condition of the lubricant passing through the first conduit. The sensors are monitored by a controller which is operative selectively to cause the valve to block the flow of lubricant through the first conduit and direct a portion of the lubricant through the second conduit based on the monitored conditions of the lubricant. Also, the controller directs a supply of fresh lubricant to the engine in response to the lubricant in the engine lubricant reservoir dropping below a predetermined level. The lubricant flowing through the second conduit may either be stored in a lubricant reservoir and if desired subsequently intermittently mixed with the fuel in the fuel tank, or caused to flow directly to the fuel tank on command of the valve by the controller which limits the amount of lubricant that can be added to the fuel tank so as not to exceed a predetermined lubricant/fuel ratio for the engine.

20 Claims, 3 Drawing Sheets

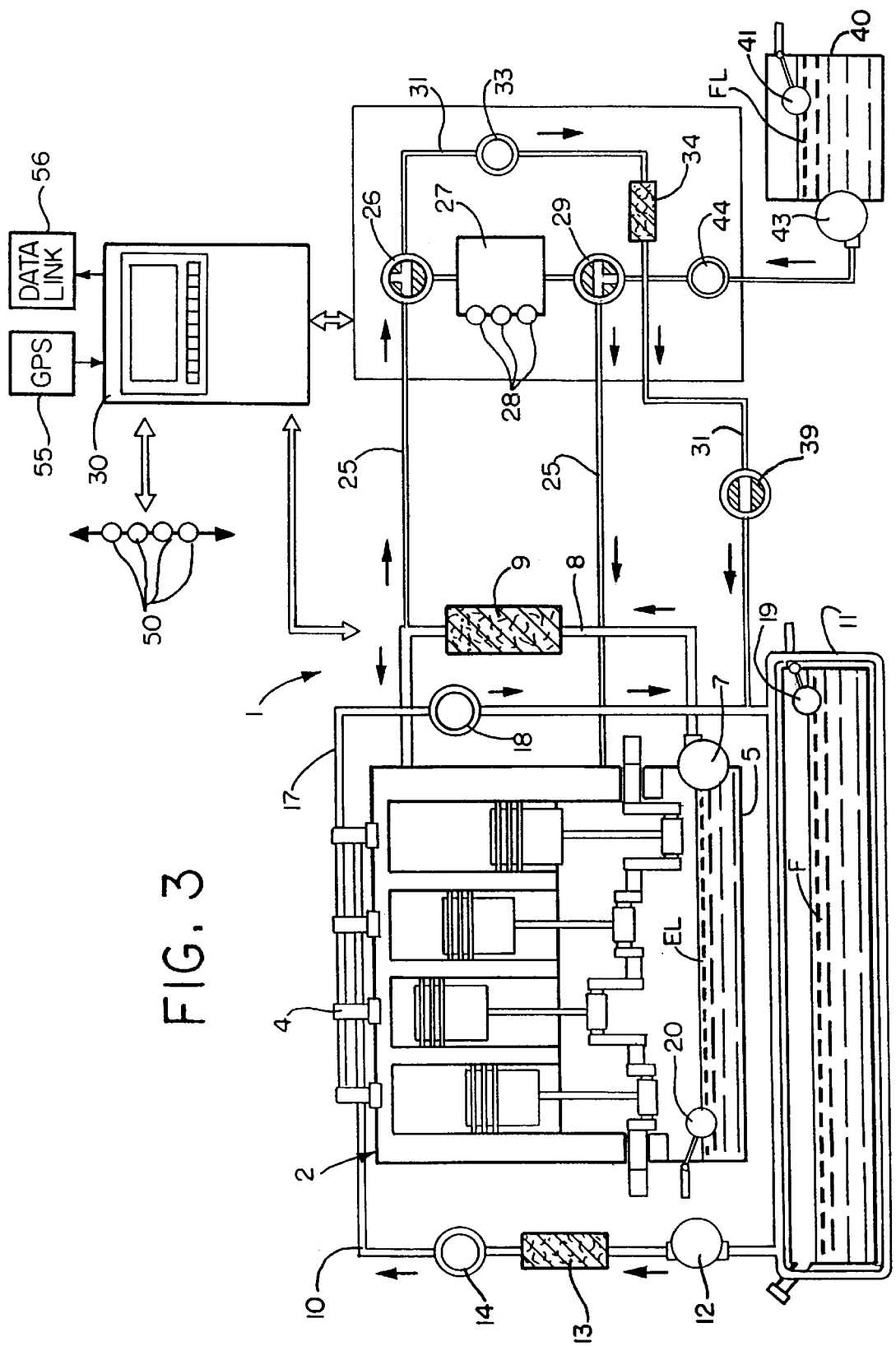

SYSTEM FOR MAINTAINING THE QUALITY AND LEVEL OF LUBRICANT IN AN ENGINE

FIELD OF THE INVENTION

This invention relates to a system that maintains the lubricant quality and level in an internal combustion engine including particularly a diesel engine.

BACKGROUND OF THE INVENTION

Maintenance of engine lubricant quality and level is essential to the proper operation and long service life of an internal combustion engine. In general, lubricant level may vary during the operation of an engine due to lubricant leakage past various seals and some consumption of the lubricant which naturally occurs in the combustion cylinders. A responsibility of the engine operator is to periodically check the lubricant level and, if needed, add an appropriate amount of fresh lubricant to maintain the lubricant at a desired level. As used herein, the term "fresh lubricant" includes a base lubricant containing desired quantities and types of fresh lubricant additives.

In general, the quality of the lubricant in an engine degrades with engine use. Lubricant degradation occurs due to depletion of lubricant additives that perform specific functions such as control viscosity, reduce wear, increase lubricity, minimize deposits, prevent oxidation, and other desirable features. Lubricant degradation can also occur by the ingestion of foreign materials into the lubricant such as dirt from the surrounding environment, wear materials from the engines that occur as part of the natural operating process, and blow-by from the combustion process. Lubricant degradation can also occur due to a break-down of the base stock of the lubricant. In the extreme case fuel and/or water contamination of the lubricant can cause lubricant degradation.

Two ways of improving the quality of the engine lubricant is to periodically remove some or all of the engine lubricant and replace it with fresh lubricant. Also, in most cases filters are used to remove foreign materials above a certain size from the engine lubricant.

Various systems have been proposed for periodically removing a given quantity of lubricant from the engine and either storing the lubricant until it can properly be disposed of, or in the case of a diesel engine, optionally periodically injecting the lubricant into the fuel tank where the lubricant is mixed with the fuel and then burned in the engine along with the fuel. Also, it is generally known to provide such systems with automatic lubricant level sensing devices which maintain the proper level of lubricant in the engine.

In some systems, a given quantity of the engine lubricant is removed at preset time intervals based on engine usage factors. In others, small increments of engine lubricant are periodically removed and substantially simultaneously replaced with correspondingly small increments of fresh lubricant. In still others, a given amount of engine lubricant is periodically removed based on sensors that measure different operating variables of the engine such as the level, temperature and/or pressure of the lubricant within the engine, the number of engine starts or crank shaft revolutions, the length of time the engine has been in motion and at rest, engine temperature, fuel consumption, etc.

However, there is still a need for a system that more effectively determines the condition and thus the quality of the engine lubricant, and when the quality of the engine lubricant degrades a predetermined amount, periodically removes a portion of the engine lubricant and replaces it with fresh lubricant to maintain the quality of the engine lubricant above a predetermined minimum high level.

SUMMARY OF THE INVENTION

The present invention relates to certain improvements in systems for maintaining the quality and level of lubricant in an engine including particularly how the system determines and maintains the quality and level of the lubricant in an engine.

In accordance with one aspect of the present invention, the system includes a flow path through which a portion of the lubricant that is being circulated through the engine is diverted for diagnosis by sensors in the flow path and then returned to the engine for recirculation.

In accordance with another aspect of the invention, when the engine lubricant has degraded a predetermined amount as determined by the sensors in the flow path, the system diverts a predetermined amount of the engine lubricant to a lubricant reservoir or to the engine fuel tank.

In accordance with another aspect of the invention, the system includes a controller that is operative in response to predetermined engine lubricant quality measurements by the sensors in the flow path to cause a predetermined amount of the engine lubricant to be diverted to the lubricant reservoir or to the engine fuel tank.

In accordance with another aspect of the invention, the engine lubricant that is diverted to the lubricant reservoir remains stored in the lubricant reservoir until the system controller commands pumping a predetermined amount of the stored engine lubricant to the engine fuel tank.

In accordance with another aspect of the invention, the system controller commands that engine lubricant be added to the fuel tank either during fueling or shortly thereafter and preferably while the engine is operating in order to mix the engine lubricant with relatively warm, rapidly flowing fuel in a common line that returns excess fuel from the engine injectors to the fuel tank.

In accordance with another aspect of the invention, the system controller determines the amount of engine lubricant to be added to the fuel tank based on the amount of fuel added to the fuel tank and the measurements of the sensors to insure that the lubricant-fuel mixture within the fuel tank does not exceed a predetermined lubricant/fuel ratio.

In accordance with another aspect of the invention, the system controller monitors sensors in the flow path through which a portion of the engine lubricant is diverted which measure such lubricant conditions as temperature, pressure, dielectric and/or viscosity to diagnose the engine lubricant quality.

In accordance with another aspect of the invention, the system controller may on command optionally divert a portion of the engine lubricant directly to the fuel tank or to a lubricant reservoir for storage prior to being delivered to the fuel tank.

In accordance with another aspect of the invention, the system controller on command periodically adds fresh lubricant to the engine to maintain the quality and level of the engine lubricant.

In accordance with another aspect of the invention, when the engine lubricant drops below a predetermined level within the engine, the system controller interrupts the flow of engine lubricant through the flow path containing the sensors, and causes fresh lubricant to be added to the engine through the flow path downstream of the sensors until the engine lubricant is brought back up to such predetermined level.

In accordance with another aspect of the invention, the system controller may be used to communicate the monitored data from the sensors to a remote site through a data link.

In accordance with another aspect of the invention, the system controller may be used to keep track of the location of the engine via a Global Position Satellite (GSP) unit.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 3 is a schematic illustration of a modified system in accordance with this invention in which pressurized engine lubricant is diverted directly to the engine fuel tank on command of a system controller.

DETAILED DESCRIPTION OF THE PREFERRED EMBODIMENTS

Figure 1:
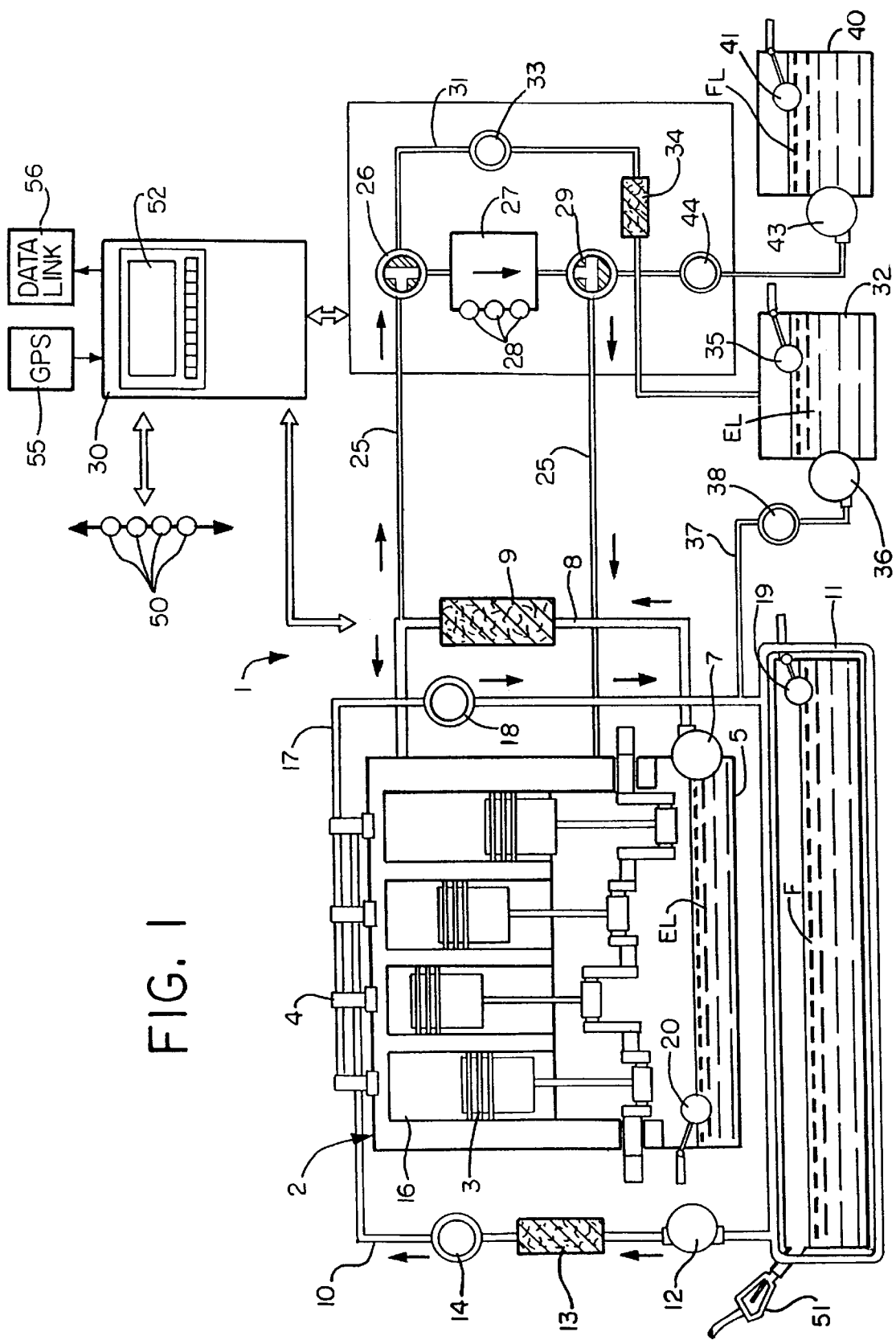
FIG. 1 is a schematic illustration of one form of system in accordance with the present invention in which a portion of the pressurized engine lubricant is shown being diverted through a flow path containing a diagnostic cell for determining lubricant quality and then returned to the engine lubricant sump.

Referring now in detail to the drawings, and initially to FIG. 1, there is schematically shown one form of a system 1 in accordance with the present invention for maintaining the quality and level of lubricant EL in an internal combustion engine 2, which may for example be a diesel engine used to power a locomotive. The engine 2 is schematically shown in section in FIG. 1 with the usual pistons 3, fuel injectors 4, and engine lubricant sump 5 containing the engine lubricant EL. Also, an engine driven lubricant pump 7 is shown which, when driven by the engine 2, causes the engine lubricant EL to flow from the sump 5 through an external lubricant line 8 containing a filter 9 and onto the moving parts of the engine to minimize friction and wear. The engine lubricant then returns to the sump 5 for recirculation through the fluid line 8 and onto the engine parts as before.

The lubricant EL within the engine sump 5 is typically near atmospheric pressure, whereas the lubricant in the fluid line 8 external to the engine 2 is at a significantly higher pressure, for example on the order of 30 psi or greater.

Also shown in FIG. 1 is the fuel line 10 through which fuel F is pumped from a fuel tank 11 by a fuel pump 12 through a fuel filter 13 and meter 14 to the fuel injectors 4 of the engine during engine operation. Depending on the throttle position of the engine, each injector 4 injects metered amounts of fuel into the combustion chambers 16 at very high pressures. The excess fuel serves to cool the injectors 4 and is returned to the fuel tank 11 through a common line 17 containing a fuel meter 18. Level sensors 19, 20 in both the fuel tank 11 and engine sump 5 roughly determine the liquid volume in each of these reservoirs.

For determining the quality of the engine lubricant EL, the system 1 includes a fluid conduit 25 connected to the high pressure engine lubricant line 8 upstream of the engine lubricant filter 9. Conduit 25 contains a three-way valve 26 which, in the normal "off" state shown in FIG. 1, directs a portion of the pressurized engine lubricant EL through a diagnostic cell 27 containing a plurality of sensors 28 for diagnosing certain qualities or characteristics of the engine lubricant, for example, the temperature, pressure, dielectric and/or viscosity of the engine lubricant. Downstream of the diagnostic cell 27 is another three-way valve 29 which, in the normal "off" state, returns the portion of the engine lubricant passing through the diagnostic cell 27 to the engine lubricant sump 5 through the conduit 25.

The fluid conduit 25 is sized to restrict the rate of engine lubricant flow through the diagnostic cell 27 to a relatively small amount, for example approximately three percent of the total flow output of the engine lubricant pump 7, which is considered insignificant to the proper lubrication of the engine.

Figure 2:
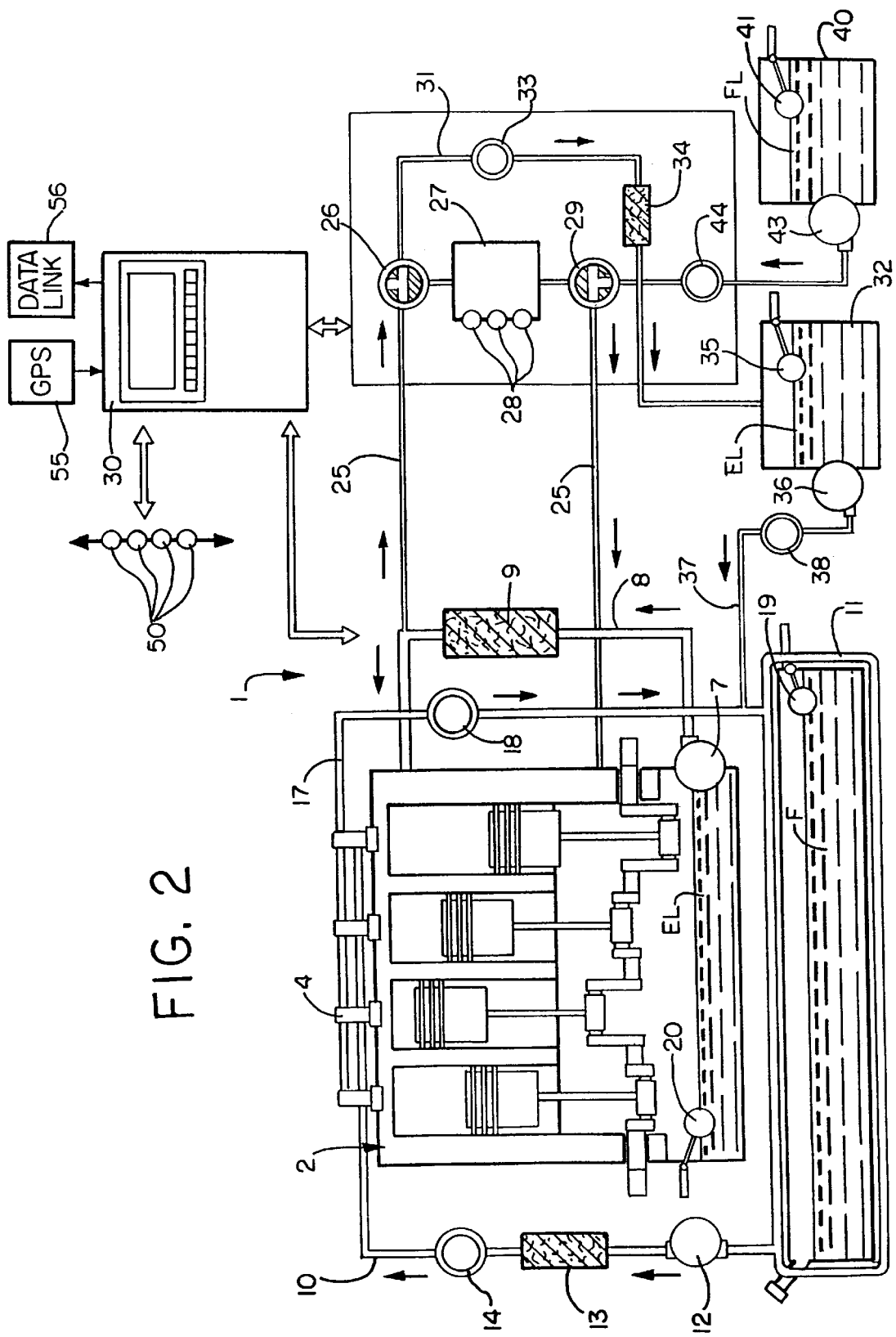
FIG. 2 is a schematic illustration of the system of FIG. 1 but showing pressurized engine lubricant being diverted into a lubricant reservoir and then into the engine fuel tank, and fresh lubricant being added to the engine lubricant sump through the flow path downstream of the diagnostic cell.

A system controller 30 monitors the outputs from the sensors 28 in the diagnostic cell 27 (and possibly others as described hereafter) to determine engine lubricant quality based on a control algorithm. When the quality of the engine lubricant drops below a predetermined level as ascertained by the controller 30, the controller periodically commands the valve 26 to redirect the diverted engine lubricant through another conduit 31 to a lubricant reservoir 32 as schematically shown in FIG. 2 where the engine lubricant may be stored until otherwise disposed of A meter 33 and filter 34 are provided in the conduit 31 upstream of the lubricant reservoir 32 for metering and filtering the lubricant before entering the reservoir. Also, a level sensor 35 is provided in the reservoir 32 for roughly determining the liquid volume in the reservoir 32.

If the engine 2 is of a type such as a diesel engine that can burn a lubricant-fuel mixture, a fluid pump 36 may be provided within the engine lubricant reservoir 32 for pumping a predetermined amount of the engine lubricant within the reservoir through a conduit 37 containing a flow meter 38 and into the common line 17 leading to the fuel tank 11 upon command by the system controller 30 as further schematically shown in FIG. 2.

Alternatively, the conduit 31 that receives the redirected engine lubricant from the engine upon command of the system controller 30 may be connected directly to the common line 17 leading to the fuel tank 11 as schematically shown in FIG. 3, thus eliminating the need for the engine lubricant reservoir 32 and associated pump 36, conduit 37 and flow meter 38. In that event, a further valve 39 is desirably provided in the conduit 31 which, when activated by the system controller 30, prevents the flow of engine lubricant through the conduit 31 to the fuel tank 11 as a safety in the event the valve 26 should fail and the fresh lubricant pump 43 (described hereafter) is not operating.

However, storing the engine lubricant in a reservoir 32 prior to adding the engine lubricant to the fuel tank 11 has the advantage that periodic activation of the valve 26 to remove some of the engine lubricant from the engine does not have to coincide with fueling of the fuel tank. Also, the amount of engine lubricant that is removed from the engine at any given time can be greater than the maximum amount that could be added to the fuel tank at that time without exceeding a predetermined lubricant/fuel ratio for the particular engine.

In either case, the engine lubricant is preferably added to the fuel tank 11 either in conjunction with the fueling of the fuel tank or as soon after fueling as possible to maximize the amount of engine lubricant that can be added to the fuel without exceeding a predetermined lubricant/fuel ratio for the engine. Also, the engine lubricant is desirably added to the fuel tank 11 through the common line 17 only while the engine is operating so that the engine lubricant will be mixed with the warm, relatively rapidly flowing fuel returning from the injectors 4 to the fuel tank.

The system 1 also includes a reservoir 40 containing fresh lubricant FL for use in maintaining the desired quality and level of engine lubricant EL within the engine lubricant sump 5. A sensor 41 is provided in the reservoir 40 for roughly determining the volume of fresh lubricant within the reservoir. The fresh lubricant reservoir 40 is desirably selectively connected to the same conduit 25 through which the diverted engine lubricant EL is normally recirculated back to the engine 2 by the three-way valve 29 in the conduit 25 downstream of the diagnostic cell 27. When commanded by the system controller 30, the valve 29 moves to a position blocking flow of engine lubricant from the diagnostic cell 27 and allowing fresh lubricant to be pumped from the fresh lubricant reservoir 40 by a pump 43 within the reservoir through a meter 44 into the conduit 25 downstream of the diagnostic cell 27 and into the engine 2 as schematically shown in FIGS. 2 and 3.

In operation, the system controller 30 monitors the sensors 28 in the diagnostic cell 27, the level sensors 35 and 41 in the lubricant reservoirs 32 and 40, the flow meter 33 for measuring the rediverted flow of engine lubricant to the lubricant reservoir 32 or to the fuel tank 11, and the flow meters 38 and 44 for measuring the outflows from the lubricant reservoirs 32 and 40. Also, the system controller 30 may be used to monitor other components which include the lubricant level sensor 20 in the engine lubricant sump 5, the fuel level sensor 19, and possibly the fuel meters 14 and 18 as well as other sensors 50 mounted in conjunction with or on the engine, schematically shown in the drawings, for measuring such engine parameters such as engine usage based on one or more operating variables of the engine or of the equipment powered by the engine including the number of engine starts, engine running time, number of miles driven, amount of fuel used since the last fresh lubricant addition, etc.

Based on the monitored sensors and/or components, the system controller 30 determines when to activate the valve 26 to redirect a portion of the lubricant EL from the engine 1 to the lubricant reservoir 32 (or directly to the engine fuel tank 11 if no lubricant reservoir is provided), and when to activate the valve 29 and pump 43 in the fresh lubricant reservoir 40 to transfer fresh lubricant to the engine sump 5 to maintain the quality and level of the lubricant in the engine. Also based on monitored sensors and/or components, the system controller 30 determines when and the amount of fuel added to the engine fuel tank 11 through a nozzle 51, schematically shown in FIG. 1, and activates the pump 36 (if the engine lubricant reservoir 32 is included in the system) to add filtered engine lubricant EL from the reservoir 32 to the fuel tank 11 in an amount not to exceed a predetermined lubricant/fuel ratio, or until the engine lubricant reservoir 32 is empty. As previously indicated, the engine lubricant is preferably added to the fuel tank 11 either in conjunction with the fueling or as soon thereafter as possible, but preferably only while the engine 2 is operating so that the engine lubricant is mixed with the warm, rapidly flowing fuel returning from the injectors 4 to the fuel tank 11 through the common line 17.

Of course, if the system 1 does not include a engine lubricant reservoir 32, and the redirected engine lubricant is added directly to the fuel tank 11 as schematically shown in FIG. 3, the system controller 30 would preferably not activate the valve 26 to redirect the engine lubricant to the engine fuel tank 11 except in conjunction with the fueling or as soon after fueling as possible, and preferably only while the engine is operating for the reasons previously described.

Also based on monitored sensors and/or components, the system controller 30 determines when to activate the valve 29 for blocking the flow of diverted engine lubricant through the diagnostic cell 27 and the pump 43 in the fresh lubricant reservoir 40 to transfer fresh lubricant into the engine.

The system controller 30 includes a display 52 that allows visual output of the monitored sensors and/or components. Also, the system controller 30 may be used to keep track of the engine location via a Global Position Satellite (GPS) unit 55. In addition, the system controller 30 may be used to communicate the data that it receives from the sensors and/or components to a remote site through a data link 56 such as a satellite communications modem.

The various lubricant flow meters 33, 38 and 44 and fuel flow meters 14 and 18 would be redundant if the lubricant and fuel level sensors 20, 35, 41 and 19 were highly accurate. However, in the usual case, such level sensors only provide relatively rough measurements of the liquid volume in the sump 5, reservoirs 32 and 40 and tank 11, which are sufficient to maintain proper lubricant level in the engine 2, to limit the lubricant to fuel ratio in the fuel tank 11, to prevent the removal of lubricant EL from the engine 2 if there is not sufficient fresh lubricant in the fresh lubricant reservoir 40 to replace the removed amount, and to prevent the removal of lubricant from the engine 2 if there is not sufficient volume to receive the lubricant in the lubricant reservoir 32.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A system for maintaining the quality and level of lubricant in an engine lubricant reservoir comprising valve means for selectively diverting a portion of lubricant from said engine lubricant reservoir either through a first flow path that returns the lubricant to an engine or through a second flow path that removes a portion of the lubricant from said engine lubricant reservoir, sensor means in said first flow path downstream of said valve means for diagnosing the lubricant passing through said first flow path, a controller operative in response to predetermined lubricant measurements by said sensor means to cause said valve means intermittently to divert the flow of a portion of the lubricant through said second flow path, and means for periodically adding fresh lubricant to said engine.

2. The system of claim 1 wherein said controller is also operative in response to one or more monitored conditions of said engine to cause said valve means intermittently to divert the flow of a portion of the lubricant through said second flow path.

3. The system of claim 1 further comprising second valve means in said first flow path downstream of said sensor means, said means for periodically adding fresh lubricant to said engine comprising a fresh lubricant reservoir in fluid communication with said second valve means, said second valve means being operable by said controller to establish fluid communication between said engine and one or the other of said sensor means and said fresh lubricant reservoir.

4. The system of claim 3 further comprising a level sensor for sensing the level of lubricant in said engine lubricant reservoir, said controller being responsive to said level sensor detecting a predetermined drop in the level of lubricant within said engine lubricant reservoir to cause said second valve means to establish fluid communication between said fresh lubricant reservoir and said engine through said first flow path downstream of said sensor means.

5. The system of claim 4 further comprising a pump operable by said controller when said second valve means establishes fluid communication between said fresh lubricant reservoir and said engine for supplying fresh lubricant to said engine under pressure.

6. The system of claim 4 further comprising a meter monitored by said controller for metering the flow of fresh lubricant from said fresh lubricant reservoir to said engine.

7. The system of claim 2 further comprising a meter monitored by said controller for metering the volume of lubricant flowing through said second flow path.

8. The system of claim 1 further comprising an engine lubricant pump for circulating the lubricant from said engine lubricant reservoir through the engine, said first flow path being in fluid communication with a high pressure side of said engine lubricant pump for receiving a pressurized portion of the lubricant from said engine lubricant reservoir.

9. The system of claim 8 further comprising a filter between said engine lubricant pump and said first flow path for filtering the pressurized lubricant prior to entering said first flow path.

10. The system of claim 1 further comprising a lubricant reservoir for receiving lubricant flowing through said second flow path.

11. The system of claim 10 further comprising a pump for pumping lubricant from said lubricant reservoir to a fuel tank for the engine.

12. The system of claim 11 wherein said pump is operable on command of said controller only to pump lubricant to said fuel tank during or shortly after fueling of said fuel tank to maximize the amount of lubricant that can be pumped into said fuel tank at any given time without exceeding a predetermined lubricant/fuel ratio for the engine.

13. The system of claim 1 wherein said engine is a diesel engine including injectors for injecting fuel received from a fuel tank into said engine, and a common line for returning excess fuel from said injectors to said fuel tank, said second flow path being in communication with said common line for directing the lubricant passing through said second flow path into said fuel tank through said common line upon command of said valve means by said controller.

14. The system of claim 1 wherein said sensor means measures the dielectric of said lubricant flowing through said first flow path.

15. The system of claim 1 wherein said sensor means measures the viscosity of said lubricant flowing through said first flow path.

16. A system for maintaining the level and quality of lubricant in an engine lubricant reservoir comprising first valve means for selectively directing a portion of lubricant from said engine lubricant reservoir through a first conduit for return to an engine or through a second conduit for removal from said engine lubricant reservoir, second valve means for directing a supply of fresh lubricant to said engine, and a controller for monitoring the condition of the lubricant in said first conduit and the level of lubricant in said engine lubricant reservoir, said controller being operative selectively to cause said first valve means to block the flow of lubricant through said first conduit and direct a portion of the lubricant to said second conduit based on the monitored condition of the lubricant, and to cause said second valve means to direct the supply of fresh lubricant to said engine in response to the lubricant in said engine lubricant reservoir dropping below a predetermined level.

17. The system of claim 16 wherein said second conduit is in fluid communication with a lubricant reservoir for storage of the lubricant received from the engine.

18. The system of claim 17 further comprising a pump for pumping a portion of the lubricant stored in said lubricant reservoir to a fuel tank for the engine on command by said controller.

19. The system of claim 16 wherein said second conduit is in direct fluid communication with a fuel tank for the engine, said first valve means being operative on command of said controller to direct a portion of the lubricant through said second conduit during the fueling of said fuel tank or shortly thereafter in an amount not to exceed a predetermined lubricant/fuel ratio for the engine.

20. The system of claim 16 wherein said first conduit is in fluid communication with a diagnostic cell downstream of said first valve means containing sensors which are monitored by said controller to determine the condition of the lubricant flowing through said first conduit.

* * * * *